Nov. 28, 1967   J. R. JOHNSON ETAL   3,354,915
TYING APPARATUS

Filed Jan. 25, 1965   5 Sheets-Sheet 3

INVENTORS.
JOHN R. JOHNSON
ROBERT W. TAYLOR
BY
ATTORNEYS.

Nov. 28, 1967  J. R. JOHNSON ETAL  3,354,915
TYING APPARATUS

Filed Jan. 25, 1965  5 Sheets-Sheet 4

INVENTORS
JOHN R. JOHNSON
ROBERT W. TAYLOR
BY
Christie, Parker & Hale
ATTORNEYS.

Nov. 28, 1967  J. R. JOHNSON ETAL  3,354,915
TYING APPARATUS

Filed Jan. 25, 1965

INVENTORS.
JOHN R. JOHNSON
ROBERT W. TAYLOR
BY
Christie, Parker + Hale
ATTORNEYS.

United States Patent Office 3,354,915
Patented Nov. 28, 1967

3,354,915
TYING APPARATUS
John R. Johnson, Arcadia, and Robert W. Taylor, Crestline, Calif., assignors to Royal Industries, Inc., Pasadena, Calif., a corporation of California
Filed Jan. 25, 1965, Ser. No. 427,546
13 Claims. (Cl. 140—93)

ABSTRACT OF THE DISCLOSURE

Tying apparatus for tagging and tying articles with resilient tie material capable of being twisted to form a tie by automatically actuating the machine upon presentation of an article to be tied to cause the tie material to be wrapped around a tag positioned in the machine adjacent the article to be tied and tied to both thereby allowing the tagged and tied article to be removed from the tying apparatus.

The tagging and tying apparatus includes means for holding a tag in the apparatus and a trigger actuator for engaging an article to be tied in its path to the tying and cutting device to actuate the apparatus for a tagging and tying cycle. Upon actuating the apparatus, a preselected length of tie material is advanced adjacent the tying and cutting device and a tie material wrapping arm thereby engaging the tag. The delivery of the tie material causes the wrapping arm to wrap the adjacent length of tie material around the article to be tied in a substantially U-shaped configuration and thereby the tag. Sequentially, then, the wrapped tie material is engaged by the tying and cutting device and twisted upon itself while substantially simultaneously severing the material from its source of supply thereby allowing the tagged and tied artcle to be removed from the apparatus.

---

This invention relates to apparatus for tagging and twisting ties about items such as the tops of open mouth bags and like articles.

This invention is an improvement over the tying apparatus described in the co-pending application bearing Ser. No. 406,960, filed on Oct. 23, 1964, entitled Tying Apparatus and assigned to the same assignee as the present application.

At the present time there are a number of machines that are commercially available for tying the tops of bags or other similar articles. In a large number of instances it is necessary that the ingredients of the articles stored in the bags be recited or listed on the bag proper. This then necessitates the use of a specific bag for the article stored in the bag so that the recited ingredients correspond. Alternatively, a standard bag may be employed wherein the ingredients are printed on a tag and the tag secured to the bag in some fashion. In general, the tags are presently secured to the bag by means of a manual operation, particularly when tie material that can be tied by twisting is employed as the bag closure. One such tie material is described in United States Patent 3,068,135. At the present time there is no satisfactory machine for automatically closing a bag and tagging the bag particularly with the bag closing machines that employ tie material that is tied with a twist. Accordingly, there is a need for a tying machine that employs tie material that is capable of being twisted to form a tie and that automatically tags the article being tied.

The present invention is an improvement over the tying apparatus described in the aforementioned co-pending application which employs tying material capable of being twisted to form a tie. The present invention advantageously employs the basic tying mechanism of the tying machine described in the aforementioned co-pending application along with the addition of tag feeding means and the apparatus that allows an article to be tied to be simultaneously tagged during the tying operation. Although the tag feeding means of the present invention is particularly directed to the manual feeding of tags into the tying machine, it will be appreciated by those skilled in the art that the tags may be automatically fed from a hopper into the machine as well. The present invention takes advantage of the positioning or feeding of the tie material through an unobstructed path of sufficient length to allow a tag, and in particular an apertured tag, to be fed and/or positioned in this path to secure the tag to the tie material.

From a structural standpoint, the present invention is directed to a tagging and tying apparatus which includes a rotatable cutting and twisting head and means for storing a continuous length of tie material that is fed along a predetermined path adjacent the cutting and twisting head to be operated on by the head. The apparatus further includes means for feeding a pre-selected length of the tie material along the predetermined path and tag feeding means for positioning an apertured tag in the feed path of the tie material to be threaded through the aperture and thereby mounted with and carried by the tie material. The drive means for the apparatus is connected to the tie feeding means and to the tying and twisting head for operating same to cause the desired length of tie material, mounting the tag to be severed from its continuous length and to be simultaneously twisted and tied about the article or bag during the rotation of the head. The tape feeding means is particularly characterized that it is constructed and defined for releasably holding an apertured tag to allow the advancing tie material to be threaded through the tag and to release the tag when the tied article is withdrawn from the tying apparatus.

Other features and advantages of this invention will become apparent from the following detailed description and the accompanying drawings, of which:

Figure 5:
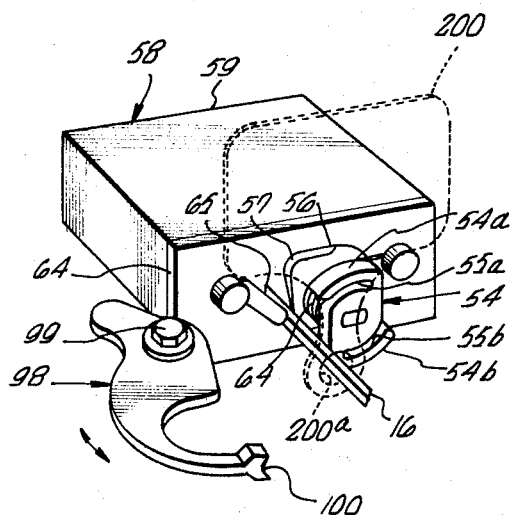
Figure 4A:
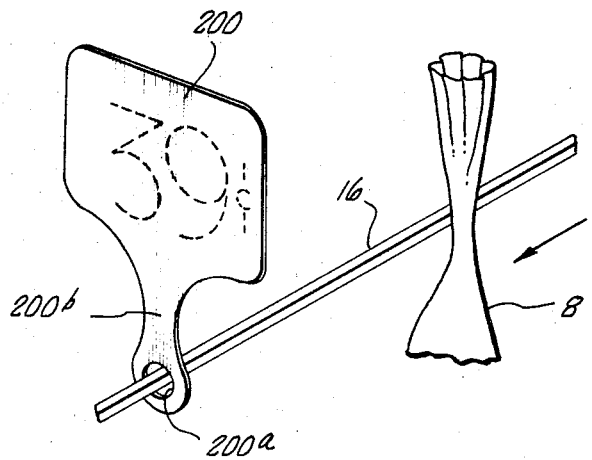
FIG. 4A is an exploded view of the tag and bag to show the relationship of the advancing tie material to pick up the tag in its path.
Figure 4B:
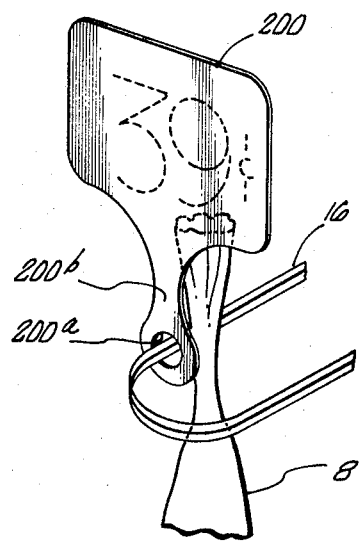
Figure 6:
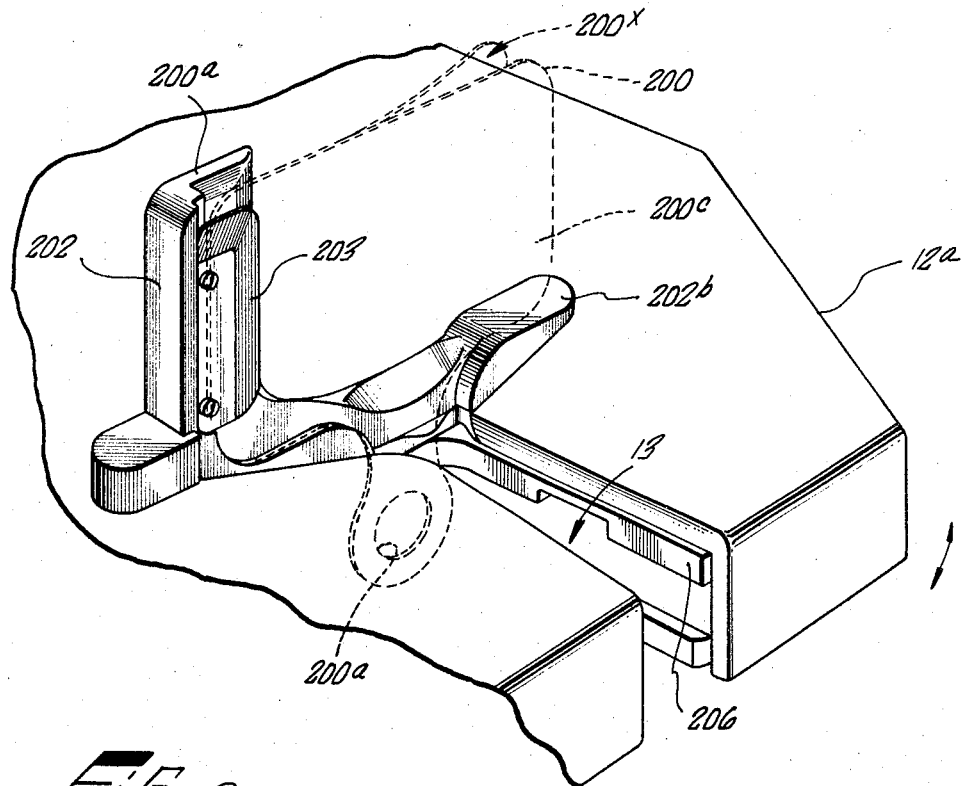
Figure 7:
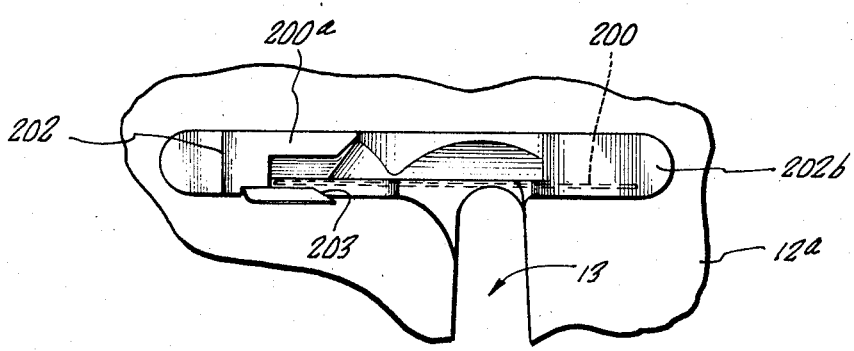

FIGS. 4B and C illustrate the progressive movement of the tie in securing a tag and wrapping the tie around the top of the bag as accomplished by the machine of the present invention;

FIG. 5 is a perspective view of the twister head, the shear blade and shear block and tag with a tie passing through the shear block and illustrating the relationship with a tag represented in dotted outline in position to be tied;

FIG. 6 is a partial perspective view of the cover for the tying apparatus showing the relationship of the tag holder with the bag receiving throat and showing the tag in dotted outline; and FIG. 7 is a partial, top view of the tag holder, with the tag removed, as illustrated, in FIG. 6.

The basic operation of the tagging and tying machine of the present invention employs the structural organization of the above identified co-pending application and which application is incorporated herein by reference. The tying machine described immediately hereinafter is presented for the purpose of facilitating the understanding of the present invention and a more detailed description of this tying machine may be had, if required, by reference to the co-pending application incorporated herein by reference.

Figure 1:
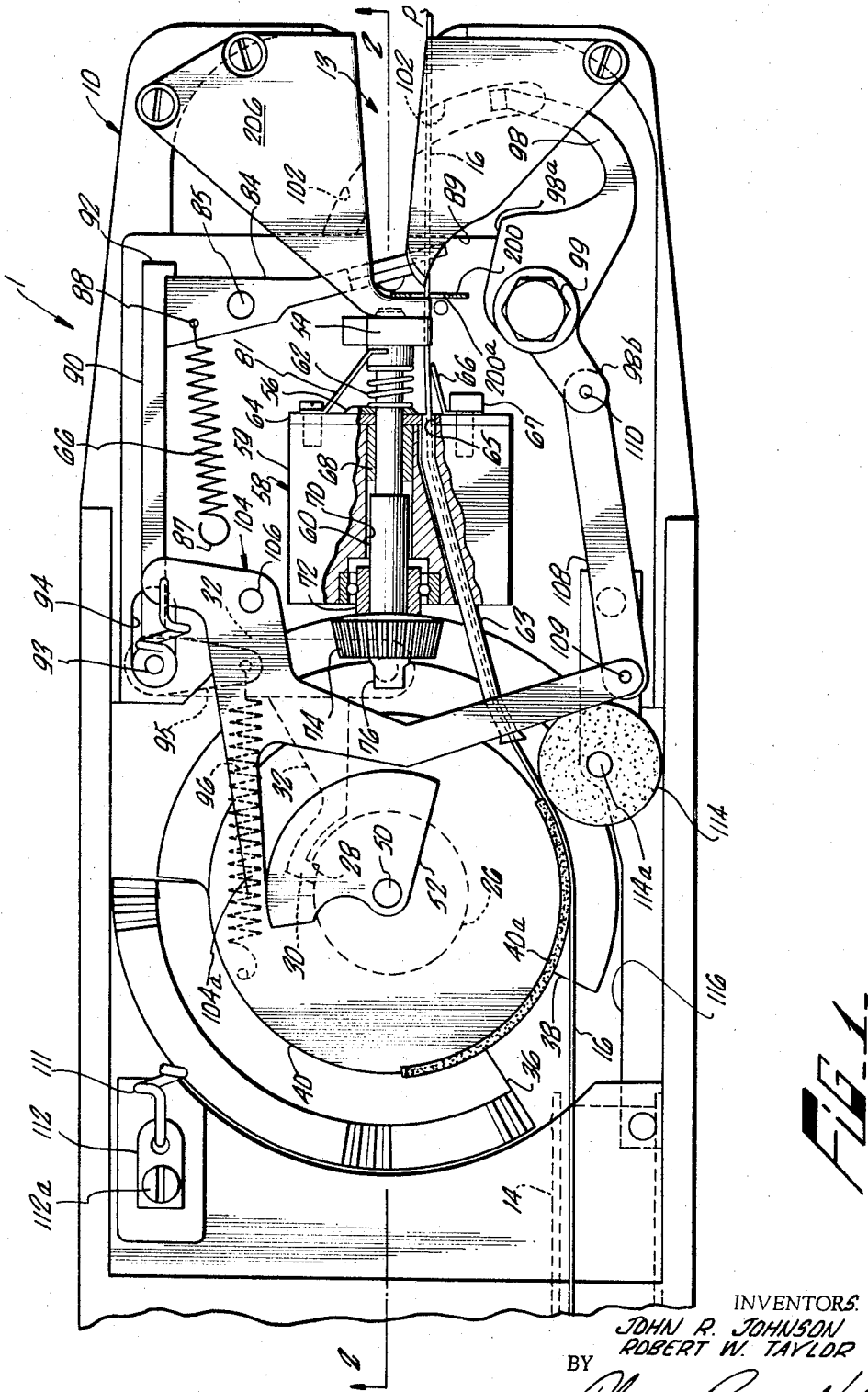
FIG. 1 is a top view of the tagging and tying machine, with the cover removed, and constructed according to the present invention with its components arranged such that a bag may be inserted to be tagged and tied.
Figure 2:
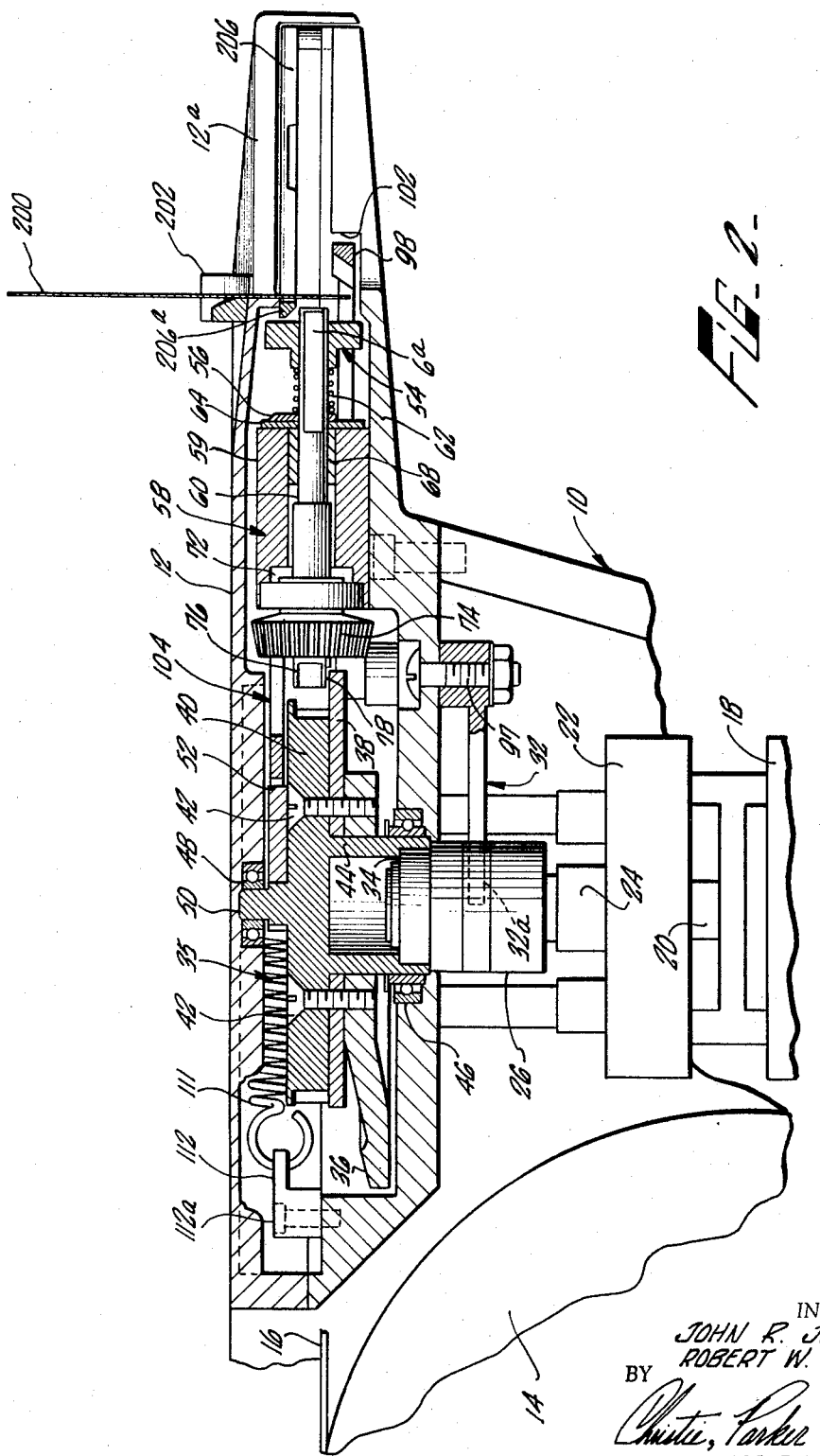
FIG. 2 is a side elevation, shown partially as a cross sectional view, with the section taken at line 2—2 of FIG. 1.

Now referring to FIGS. 1 and 2 which show a tying apparatus comprising a frame 10 having a removable cover 12 thereon and adapted to be secured to a counter top (now shown).

A V-shaped groove or throat 13 is formed in the frame 10 having converging walls for purposes of gathering the sides of the bag to be tied.

A spool 14 mounted upon a shaft (not shown) which is fixedly attached to the frame 10 contains tie material 16 in a coil form and the material may be of any suitable variety and includes such things as soft iron wire, but more preferably includes paper or plastic covered soft wire as mentioned hereinabove.

For purposes of actuating the tying mechanism, there is provided a conventional electric motor 18 with a shaft 20 which is engaged with a gear box 22 for purposes of reducing the speed of the motor output shaft 20. A shaft 24 extends outwardly from gear box 22 and has mounted thereon a conventional one way clutch 26 having formed thereon a stop 28 which is engageable with a dog 30 formed on movable arm 32. Clutch 26 is of a conventional design and one acceptable construction is illustrated in detail on page 82 of Ingenious Mechanisms for Designers and Inventors, volume 2, edited by Frankline D. Jones, The Industrial Press, 1936, New York, N.Y. This clutch is used for transforming continuous rotary motion into intermittent rotary motion allowing a single rotation of shaft 34 after the dog 30 engages stop 28. In this manner, motor 18 may be continuously rotated and as desired, the clutch 26 may be engaged by arm 32 to activate the tying mechanism. A number of other suitable clutches for performing the same function are available on the market today.

A program plate 35 which comprises a segmented bevel gear 36, a flat segmented plate 38, and a friction feeding disc 40 all which are attached to each other by a pair of flat head machine screws 42. A hub 44 integrally formed on the feeding device 40 extends downwardly through the segmented plate 38 and segmented bevel gear 36 and is pressed upon the output shaft 34 extending from clutch 26. A ball bearing 46 is pressed around the periphery of the hub 44 and a ball bearing 48 is pressed upon post 50 and the cover 12 thereby providing stability and allows rotation of the program plate 35. A cam 52 rests upon the upper portion of feeding disc 40 and is pressed upon the post 50. It is noted that the gear 36, plate 38, feeding disc 40, and cam 52 are all positioned with a different angular relation to each other and the particular purpose of this interrelation will become apparent in the discussion of the operation of the present invention.

A means for severing and twisting a tie includes a twister head 54, a shear blade 56, and a shear block 58. Twister head 54 is locked upon the shaft 60 along with shear blade 56 by a pair of flats 60A and 60B formed on opposite sides of shaft 60. Spring 62 constantly urges shear blade 56 against the shear plate 64 thereby insuring shearing action. A metal tubing 63 is mounted in a passageway of shear block 58 which directs the tie 16 therein projecting it toward twister head 54. Guide 66 is mounted upon the block 58 by screw 67 passing therethrough and retaining both guide 66 and the shear blade 64 to the block 58. Guide 66 prevents the tie material 16 from being diverted laterally with relation to the twister head 54 where it is being fed outwardly toward the right hand portion of the bag tying apparatus 1. A shaft 60 is supported on one end by a journal bearing 68 received within the main passageway 70 and ball bearing 72 mounted at its opposite end. The shaft 60 terminates in a bevel pinion gear 74 which is engageable with the segmented bevel gear 36. Shaft 60 has an extension 76 extending axially from gear 74, with a step 78 which is formed on portion 74 for engagement with segmented plate 38 (see FIG. 2) for purposes of preventing rotation of twister head 54 and shear blade 56 during a certain portion of the rotation of the program plate 35. The opening 65 in shear blade 64 is shaped such that the tie 16 is wedged therein as shear blade 56 is rotated by shaft 60 until the cutting edge 57 severs tie 16.

The twister head 54 has a profile having a generally Z-shaped configuration. A pair of arcuately shaped arms or fingers 54A and 54B and a pair of arcuately shaped slots 55A and 55B. A pair of flats, similar to the flat identified by the reference numeral 81, are formed on opposite sides of twister head 54 and are substantially parallel to each other. The proximate relation of the opening at 65 in shear blade 64 directs the tie material 16 adjacent to the flat 81 thereby allowing the tie 16 to be in alignment with slot 55B upon rotation of twister head 54. Similar action occurs on the opposite side of twister head 54 upon the doubling over of the tie material 16 as illustrated in FIG. 4B.

Guide 81 is fixedly mounted to block 59 and has an extremity formed in the shape of a foot 82, which is positioned parallel to the rotation of twister head 54, tends to urge the tie material 16 into engagement with twister head 54, and aids in more tightly twisting tie 16 upon the bag 8.

For purposes of starting the tying operation, a trigger arm 84, pivotally mounted upon post 85, normally assumes a position illustrated in FIG. 1 by the action of a coil spring 86 mounted between pin 87 and pin hole 88 urging the arm 84 against the ledge 89. An L-shaped latch 90 having a tab 92 formed thereon normally engages the trigger arm 84, as illustrated in FIG. 1. The shaft 93 is fixedly mounted to latch 90 and extends downwardly through an elongated slot 94 formed in frame 10. The coil spring 96 constantly urges crankarm 95, latch 90, and arm 32, all of which are attached to shaft 93, in the counter-clockwise direction pivoting around bolt 97, illustrated in FIG. 2. The arm 32 includes a finger 32A, having a latch 32B formed thereon which engages the stop 28 on the rotatable clutch 26 thus preventing the transfer of motion through clutch 26 when the apparatus is in the position illustrated in FIG. 1.

Upon rotation of trigger arm 84 by the bag, the latch 90 is shifted upwardly and laterally toward the right from the position illustrated in FIG. 1. The arm 32 and crankarm 95 are pivoted clockwise around bolt 97 thus lifting finger 32A upwardly and allowing the clutch 26 to transfer power to the program plate 35 allowing it to rotate through one complete revolution.

As illustrated in FIGS. 1, 2 and 6, a means for wrapping tie material a portion of a distance around the bag includes a U shaped wrapping finger 98 pivotally mounted upon a bolt 99 which is within frame 10. The wrapping finger 98 has a guide formed at its extremity for retaining the tie material 16 while it is being doubled over to the U shaped position illustrated in FIG. 4B. An outwardly shaped slot 102 is cut into the frame 10, receives the extremity of wrapping finger 98, and helps retain tie material 16 during the wrapping operation. The finger 98 is operated by rotation of a generally T shaped member 104 and link 108. The member 104 is pivotally mounted upon frame 10 by a pin 106 passing therethrough and link 108 is pivotally attached to member 104 by pin 109 and also pivotally mounted on finger 98 by pin 110. The spring 111 engages T-shaped member 104 and is restrained by bracket 112 which is attached to frame 10 by bolt 112A. The normal position of the finger 98 is illustrated in FIG. 1 since spring 111 constantly urges member 104 in the counter-clockwise direction thereby tending to laterally shift link 108 generally to the right and pivot finger 98 counter-clockwise until the U shaped surface 98A engages the gathered portion of bag 8. The arm 104A extends radially from the T shaped member 104 and rides on the cam 52 during a portion of its rotation thereby causing the member 104 to be pivoted clockwise, dragging link 108, and pivoting wrapping finger 98 clockwise to the position illustrated in FIG. 1. Thus it will be appreciated that as arm 104A drops from cam 52, spring 111 will pivot member 104, drag link 108, and pivot wrapping finger 98 to its operative position.

The means for feeding tie material 16 includes feeding disc 90 and the idler 114. The feeding disc 40 has thereon a strip 40A fabricated from an elastomer, rubber or the like and is fixedly attached to a portion of the periphery. The idler 114 rotates about pin 114A that is mounted on the member 116. Thus it will be appreciated that strip 40A forces tie 16 against idler 114 thus pulling the tie 16 from the supply reel 14 during that portion of the rotation of program plate 35 during which strip 40A is proximate to idler 114. Therefore the circumference of strip 40A is the increment of feed of tie 16 and this length is graphically illustrated in FIG. 1 which is the distance from point P to the surface of the shear plate 64.

Referring again to FIGS. 1 and 2, a means for preventing rotation of the shaft 60, shear blade 56, and twister head 54 includes the interengagement of plate 38 with the flat 78 formed on extension 76. As illustrated in FIG. 2, the shaft 60 and the associated components mounted thereon cannot rotate while the plate 38 is positioned below post 76 since step 78 prevents rotation thereof. The plate 38 extends only around a portion of the program plate and thus after sufficient rotation, the shaft 60 is free to rotate upon engagement of pinion 74 with segmented bevel gear 36. The disc 38 and post 76 keep the proper alignment of gear 74 and gear 36 to prevent clashing or locking upon engagement and also twister head 54 and shear blade 56 are kept in proper relation.

The twister head 54 only rotates during the engagement of segmented bevel gear 36 with pinion 74. It has been found in practice that approximately 1½ rotations of twister head 54 are all that are necessary to sufficiently twist tie 16 around a bag in order to retain it in place and prevent loss of the items within the bag.

The operation of the apparatus will now be described.

Referring to FIGS. 1 and 2, the motor 18 is energized by a suitable power supply (not shown), hereby supplying rotative motion to output shaft 20, gear box 22, shaft 24, and clutch 26. In the position illustrated in FIG. 1, clutch 26 is disengaged thereby not allowing power to be transmitted to the output shaft 34.

The bag is filled with articles and the open top is gathered by hand to the point where the bag top may enter the V shaped groove 13 in frame 10. The operator may hold the bag by one hand adjacent the open top as he inserts it into groove 13, forcing it outwardly until trigger arm 84 is pivoted clockwise. This action rotates latch 90 slightly counter-clockwise and laterally toward the right against the tension of spring 96. Coincidentally, arm 32 is pivoted clockwise around pin 97 until the toe 32B lifts from the stop 28 of clutch 26. Power is then supplied through clutch 26 rotating the program plate 35 through one complete revolution which takes on an average of 2 seconds during which the following motions and steps occur.

It is presumed that tie material 16 has been drawn from reel 14, extending between strip 40A and idler 114, through the tube 64 and extending through opening 65 in shear plate 64. Rotation of program plate 35 from the position illustrated in FIG. 1, will pull tie 16 from reel 14 by the co-action of strip 40A on the feeding disc 40. The tie material 16 will then extend past twister head 54 substantially parallel to the axis of shaft 60 until it reaches point P which is the metered amount of feed during each revolution of the program plate 35.

Concurrently, the cam 52 is rotated to the point where arm 104A is no longer in engagement therewith and allows the T-shaped member 104 to pivot counter-clockwise around pin 106 caused by the tension of spring 111. The link 108 is shifted laterally to the right causing wrapping finger 98 to be pivoted counter-clockwise. The wrapping finger 98 is defined to force tie material 16 in its extended position around bag 8 until it is doubled over.

At this period of rotation of program plate 35, post 76 and flat 78 are no longer in engagement with segmented plate 38 and as the segmented gear 36 engages pinion 34, the entire assembly of pinion 74, shaft 60, blade 56, and twister head 54 will then rotate during the entire time that pinion 74 is in engagement with gear 36. The shear blade 57 will rotate counter-clockwise severing tie 16 and simultaneously twister head 54 will rotate to start twisting tie material 16. At the start of the twisting operation, the U shaped tie material passes on opposite sides of twister head 54. The rotation of head 54 causes the ties to enter the arcuately shaped slots 55A and 55B. Guide 81 with foot 82 forces the tie 16 against the back portion of twister head 54 for the purposes of tightly twisting the tie until it assumes a fully twisted position.

The twisting operation is then complete and the operator may remove the tied bag from groove 13. The arm 84 again assumes the position in FIG. 1, allowing latch 90 to return to its original position and return stop 32B abuts stop 28. The program plate 35 has made one complete revolution and has stopped in the position illustrated in FIG. 1 ready for subsequent actuation by a bag to be thrust against trigger arm 84 to again repeat the operation.

Figure 3:
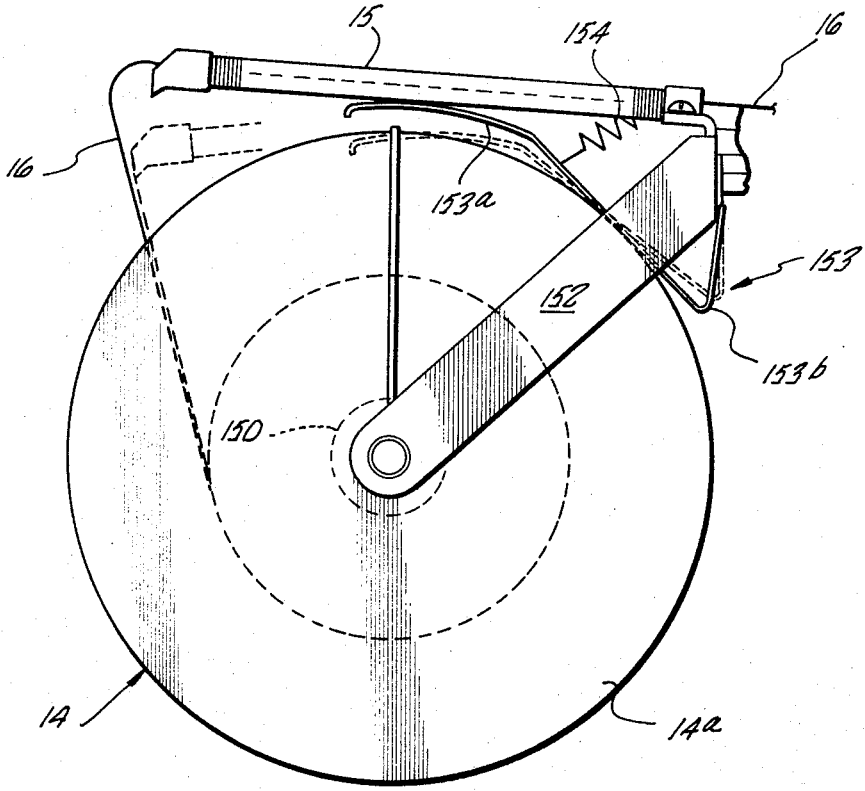
FIG. 3 is a partial elevational view of the tape storage and braking apparatus for the tying machine.

Now referring to FIG. 3, the specific provisions for preventing the unraveling of the tie material from its storage location during the intervals that the machine is inoperative and thereby always assures proper operation of the tying machine will be described. For the present, then, the operation of the tying head will be ignored and the structure and the operation of the braking mechanism will be described.

The tie material or tape is stored on a reel 14 mounted to the rear of the machine from the article tie end thereof. As illustrated, the tie material 16 is stored on the reel 14 which is comprised of a pair of spaced flanges similar to the illustrated flange 14A. The tie material is stored on the spindle 150 for the reel 14 as is conventional. The tie material then is unwrapped from the spindle 150 and passed through a tape guide 151 comprising an elongated, tubular spring mounted in a cantilever relationship with the machine frame as illustrated. The tie material is then passed from the tape guide 151 to the idler roller 114 adjacent the periphery thereof for supplying the tie cutting and twisting head proper.

The tape guide 151 is resiliently mounted in an cantilever fashion so as to have its free end movable in a vertical direction in response to the tension or pulling of the tie material 16 when the idler roller 114 functions to feed the tie material to the tying head proper. To this end, co-acting with the tape guide 151 is a braking mechanism functioning to normally brake the reel 14. An examination of FIG. 3 reveals that the reel 14 is mounted to the machine frame by means of a pair of supporting arms 152 mounted on the outside of the flanges 14a and secured to the spindle 150. The reel brake 153 is mounted to co-act with the movable tape guide 151 and to be responsive to the vertical movements of the guide 151 to place the brake 153 into engagement with the outer periphery of the flanges 14A when the machine is inoperative and to be moved out of engagement with the flanges 14A when the tape is placed under tension by means of the feed roller 114 to allow rotation of the reel 14. To this end, the brake 153 comprises a pair of resilient arms similar to arm 153A and having one end engaging the tape guide 151 intermediate its ends to be responsive to the movement of the free end of the guide 151 and has its opposite end constructed in a V shaped configuration to engage the outer periphery of the flanges 14A. This latter mentioned end of the brake arm 153 is further identified by the reference character 153B. The arm 153 is resiliently mounted intermediate its ends by means of a tension spring 154 secured thereto and to the frame of the machine as illustrated.

It should now be appreciated that when the tie material 16 is fed by means of the interengagement of the idler roller 114 and the feeding portion 40A of the feeding disc 40 that the tie material will initially be placed under tension and thereby causes the free end of the tape guide 151 to move in a downward direction as illustrated in dotted outline, and thereby causes the portion 153A of the brake arm 153 to be moved in a downward direction as is also indicated in dotted outline to cause the opposite end or the end 153B to be moved away from the flange 14A and allow the reel 14 to rotate freely. Of course, when the feed portion 40A of the feeding disc 40 is no longer engaged, the tension on the tie material 16 will be released allowing the tape guide 151 and the brake arm 153 to assume its normal braking position in engagement with the flange 14A to prevent its continuous rotation and thereby prevent the unraveling of the tie material 16 from the reel 14.

With the above description in mind, the structure for the tag feeding means for manually feeding tags into the tying machine will now be described.

The tag tying apparatus of the present invention is particularly adapted to tie an apertured tag to a bag similar to the tag identified by the reference numeral 200. The tag 200, as illustrated in FIGS. 4A and 4C is of a generally T-shaped construction with an aperture 200A defined adjacent the extremity of the upstanding portion 200B of the tag.

The broad concept of the present invention is directed to the feeding of the tie material 16 along a predetermined path in combination with the means for feeding a tag with the aperture 200A arranged in the predetermined path to allow the tag 200 to be picked up by the tie material as it is fed towards the twisting head 54. In this fashion, then, the tag 200 will be secured to the bag along with and during the tying operation for the tie material proper.

Figure 4C:
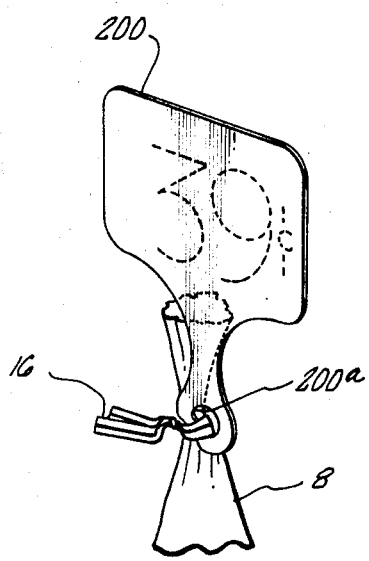

The tagging operation can be better appreciated by reference to FIGS. 4A through 4C, which diagrammatically illustrate the tagging and tying operation. The tag 200 and its relative relationship with the bag 8 as the tie material is being fed is illustrated in FIG. 4A in an exploded relationship. The tag 200 is assumed to be positioned in its upright position with the aperture 200A arranged in the feed path of the tie material 16. It will be recalled from the above description that the bag 8 is moved into the throat 13 of the tying machine to initiate the tying operation whereby a pre-selected length of tie material 16 will be fed along a predetermined path to thereby be threaded through the aperture 200A, as illustrated in FIG. 4A. As the tying operation continues, the tie material 16 now having the tag 200 secured thereto, is wrapped into a substantially U-shaped configuration about the open end of the bag 8, as best seen in the FIG. 4B wherein the actual relationship of the tag and bag are illustrated. The two ends of the tie material 16 are then twisted and tied together and, in accordance with the operation of the above described tying apparatus, the secured end of the tie material is cut from its continuous length whereby the bag 8 will be tagged and tied and assume the final configuration illustrated in FIG. 4C when withdrawn from the tagging and tying machine.

Now referring to FIGS. 2, 6 and 7, the construction of the tag positioning means for feeding the tags into the predetermined path will now be described. The tag positioning means 202 is adapted for the manual feeding of the tags 200 into the predetermined path of the tie material 16. Once again it should be noted that the positioning and feeding of the tags can be automatically provided for by means of a hopper or the like. The tag positioning means 202 is secured to the cover 12A for the tying apparatus and which cover has been slightly modified from the cover of the aforementioned co-pending application to accommodate the insertion of the tag 200 into the feed path of the tie material 16. The tag positioning means 200 is arranged adjacent the inner extremity of the throat 13 for the tying apparatus. As illustrated in FIG. 6, the tag positioning means 202 is of a generally L-shaped construction with the upstanding arm 202A of the positioning means defined to accommodate and mate with the outer configuration of the edge of the tag 200 when it is positioned upright, as illustrated. To temporarily hold the tag 200 in this relationship, a clip 203 is suitably secured to the upstanding arm 202A. The transverse arm of the tag holding means 202 is identified by the reference character 202B and extends transversely of the cover 12A to position the tag 200 with its vertical center line defined to intersect the longitudinal center line of the throat 13. It should also be noted that an important feature of the tag holding means 202 is that the right-hand edge, the free edge 200C of the tag 200, as illustrated in FIG. 6, is held relatively loosely, and the adjacent surfaces of the portion 202B of the positioning means 202 does not tightly mate therewith. The importance of this feature is that when the bag 8 is positioned in the throat 13 for actuating the tying apparatus, it allows the operator to position the bag at the innermost extremity of the throat 13, since it allows the operator to move his hand into the tag 200 and to temporarily deflect it out of its normal position, as indicated in dotted outline and identified by the reference character 200X.

The cover 12A is a movable cover, since it is hinged at the end opposite the end defining the throat 13, as in the construction of the basic tying machine described in the aforementioned co-pending application. To accommodate the tag positioning means 202 and the tag end 200B to allow for the insertion of the tag into the path of the tie material, the wrapping finger 98 is slightly modified adjacent its pivot point 99 by reducing the body thereof as illustrated in FIG. 1 and identified by the reference numeral 98A. Furthermore, to properly position the tag 200, a pair of mounting plates 205 and 206 are secured to the frame adjacent the throat 13 and define the upper walls thereof. The plate 206 is further defined with an arcuate position 206A that is arranged adjacent the twisting head 54, as illustrated. The tag 200 then will be positioned adjacent the plate 206 with its backside resting thereagainst, whereby the center line of the aperture 200A for the tag 200 is substantially coincident with the center line of the predetermined path of the tie material 16, to allow the tie material to pick up or be threaded through the aperture 200A as it is fed towards the twisting head 54. This relationship is most readily appreciated from an examination of FIG. 1.

With the above description in mind then, it should be apparent that the operation of the tagging and tying apparatus of the present invention allows the manual positioning of a tag, such as the tag 200, into the path of the tie material 16 within the machine proper. Furthermore, the manual operation of the tying machine is allowed to occur without any substantial modification whereby a bag or an article to be tagged and tied is positioned within the throat 13 of the machine. The steps of actuating the machine to cause a predetermined length of tie material to be fed to the twisting head 54 will occur in a normal fashion and in accordance with the present invention will include th picking up of the tag 200. In addition, the tie material 16 now securing the tag 200 will be essentially simultaneously twisted to tie the material around the bag and to cut off the tie material from its supply. Upon the completion of the tying operation, the bag is then removed from the throat of the tying and tagging machine carrying the tag therewith. The construction of the tag position means 202 is defined to release its hold on the tag 200 in response to the withdrawal of the bag 8.

What is claimed is:

1. Apparatus for tagging and tying articles with tie material capable of being twisted to form a tie comprising means for advancing a pre-selected length of tie material to be tied along a predetermined path, means for positioning and temporarily holding a tag in the predetermined path to be secured to the pre-selected length of tie material, and means for twisting and tying the pre-selected length of tie material around an article to be tied to thereby secure the tag to the article to be tied, the positioning means being constructed and defined to release its hold on the tag with the withdrawal of the tied article from the tying apparatus.

2. Apparatus for tying articles with tie material capable of being twisted to form a tie as defined in claim 1 wherein the tag is provided with an aperture and is held by said positioning means with the aperture in the predetermined path whereby the advancing tie material is threaded through the aperture.

3. Apparatus for tying articles with tie material capable of being twisted to form a tie as defined in claim 1 wherein the positioning means comprises a substantially L-shaped member mounted out of the predetermined path and defined to accept and hold at least an edge of a tag and to position a portion of the tag into the predetermined path.

4. Apparatus for tagging and tying articles with tie material capable of being twisted to form a tie comprising a rotatable twisting head, means for positioning tags adjacent said twisting head to be carried by the tie material, means for positioning a pre-selected length of tie material to engage and carry a tag positioned in the path of the tie material and positioning the tie material in an essentially U shaped configuration about an article to be tied and to be operated on by said head, and drive means connected for operating said positioning means and for rotating said head for a pre-selected interval to cause the twisting element to engage the portions of the tie material defining the arms of the U shaped material for twisting them along with the tag to the article being tied.

5. Apparatus for tagging and tying article with tie material capable of being twisted to form a tie comprising a rotatable twisting head, means for positioning tags adjacent said twisting head to be carried by the tie material, means for positioning a pre-selected length of tie material in an essentially U shaped configuration about an article to be tied and to be operated on by said head, drive means connected for operating said positioning means and for rotating said head for a pre-selected interval to cause the twisting lement to engage the portions of the tie material defining the arms of the U shaped material for twisting and tying them to the article being tied, and means constructed and defined for movement in the path of the article to be tied to the twisting head and to be moved by the article and coupled to said drive means for actuating same in response to said movement, said tag positioning means being further characterized as releasably holding the tag to allow the tied and tagged article to be withdrawn from said actuating means and thereby from the apparatus.

6. Apparatus for tying articles with tie material capable of being twisted to form a tie as defined in claim 5 wherein said twisting head includes a twisting element of a generally Z shaped configuration to receive the tie material defining the arms of the U shaped material.

7. Apparatus for tying articles with tie material capable of being twisted to form a tie comprising a rotatable cutting and twisting head, means for storing a continuous length of tie material, means for feeding a pre-selected length of the tie material adjacent said head to be operated on by said head, tag feeding means for positioning an apertured tag in the feed path of the tie material to be threaded through the aperture and thereby mounted to the tie material to be carried therewith, and drive means connected to said feeding means and said twisting head for operating same to cause the pre-selected length of tie material carrying the tag to be severed from its continuous length and to be simultaneously twisted and tied about an article during the rotation of said head.

8. In tying apparatus wherein tie material is advanced around an article to be tied and automatically tied thereto, the improvement of which comprises mens for releasably holding a tag in the path of the advancing tie material to be picked up by the tie material and tied to the article therewith.

9. Tagging and tying apparatus comprising a frame, means for storing a continuous length of tie material mounted on the frame, a cutting and twisting head mounted on the frame in spaced relationship with the storing means, drive means mounted on the frame and connected to said head for actuating same, trigger means movably mounted adjacent said head to intercept an article to be tied and responsive to the engagement of an article therewith for actuating the drive means for a pre-selected interval, means responsive to the actuation of said drive means for feeding a pre-selected length of tie material adjacent said head in a position to be twisted and tied to the article and simultaneously severed from the continuous length of tie material by said head, and tag feeding means for positioning a tag in the feed path of the tie material to be intercepted and carried by the tie material to thereby be tied to the article being tied.

10. Tying apparatus comprising rotatable means for storing and supplying a continuous length of tie material, a rotatable cutting and twisting head for receiving the tie material and twisting it on itself and cutting it from the continuous length supplied, a movable wrapping finger mounted adjacent said head to receive the tie material and to wrap it around an article to be tied and to be received by said head for twisting and cutting, means for receiving the tie material from said storing means and feeding a pre-selected length of tie material adjacent said wrapping finger, tag feeding means for temporarily holding a tag and positioning a tag into the feed path of the tie material to be carried thereby, trigger means mounted to intercept an article to be tied when positioning the article adjacent said head and to be movable therewith, drive means connected to be responsive to the movement of the trigger means towards said head to be actuated thereby for a pre-selected interval, programming means coupled to said drive means and connected to said feeding means, wrapping finger and cutting and twisting head for operating same in a pre-selected sequence whereby a portion of tie material carrying the tag is first fed by said head and is partially wrapped around the article to be tied by the wrapping finger and to be simultaneously twisted around the article and cut from the length of the material by said head thereafter, and braking means normally engaging said storing means for preventing the supplying of tie material except during the feeding intervals determined by said programming means.

11. Tying apparatus as defined in claim 10 wherein the tag feeding means is constructed and defined to receive an apertured tag and releasably hold the tag in the path of the tie material with the tag aperture in position to accept the tie material and to be carried therewith when tied.

12. Apparatus for tagging and tying articles with tie material capable of being twisted to form a tie comprising a rotatable twisting head, means for advancing a pre-selected length of tie material toward an article to be tied and toward said head to be operated on by said head, drive means connected for operating said advancing means and for rotating said head for a pre-selected interval to cause the twisting element to twist the tie material to the article being tied, operating means constructed and defined for movement in the path of the article to be tied to the twisting head and to be moved by the article and coupled to said drive means for actuating same in response to said movement, cover means for the above recited elements defining a throat to allow an article to be tied to be positioned adjacent said twisting head and thereby engage and actuate said operating means, and tag holding means mounted on said cover means adjacent the throat for releasably holding a tag to extend into the path of the advancing tie material to be picked up thereby and tied to the article therewith.

13. Apparatus for tagging and tying articles as defined in claim 12 wherein the tag holding means is defined with an upstanding arm for releasably holding an edge of a tag and which arm is defined to mate with the contour of said tag edge.

References Cited

UNITED STATES PATENTS

| | | | |
|---|---|---|---|
| 1,181,284 | 5/1916 | Bates | 140—93 |
| 1,821,506 | 9/1931 | Foulder | 53—135 |
| 3,211,187 | 10/1965 | Paule et al. | 53—135 |
| 3,261,143 | 7/1966 | Platt et al. | 53—135 |

CHARLES W. LANHAM, *Primary Examiner.*

E. M. COMBS, *Assistant Examiner.*